US009317108B2

(12) United States Patent
Touma et al.

(10) Patent No.: US 9,317,108 B2
(45) Date of Patent: Apr. 19, 2016

(54) HAND-HELD WIRELESS ELECTRONIC DEVICE WITH ACCELEROMETER FOR INTERACTING WITH A DISPLAY

(71) Applicants: Pierre A. Touma, Austin, TX (US); Hadi Murr, Beirut (LB); Elias Bachaalani, Beirut (LB); Imad Maalouf, Beirut (LB)

(72) Inventors: Pierre A. Touma, Austin, TX (US); Hadi Murr, Beirut (LB); Elias Bachaalani, Beirut (LB); Imad Maalouf, Beirut (LB)

(*) Notice: Subject to any disclaimer, the term of this patent is extended or adjusted under 35 U.S.C. 154(b) by 496 days.

(21) Appl. No.: 13/573,945

(22) Filed: Oct. 15, 2012

(65) Prior Publication Data

US 2014/0104156 A1   Apr. 17, 2014
US 2015/0248157 A9   Sep. 3, 2015

Related U.S. Application Data

(63) Continuation-in-part of application No. 12/590,897, filed on Nov. 16, 2009, now Pat. No. 8,325,138, which is a continuation of application No. 11/263,710, filed on Oct. 31, 2005, now Pat. No. 7,683,883.

(60) Provisional application No. 60/624,335, filed on Nov. 2, 2004.

(51) Int. Cl.

| G06F 3/03 | (2006.01) |
|---|---|
| G06F 3/0346 | (2013.01) |
| G06F 3/01 | (2006.01) |
| G06F 3/038 | (2013.01) |
| G06F 3/0481 | (2013.01) |

(52) U.S. Cl.
CPC ........ *G06F 3/01* (2013.01); *G06F 3/014* (2013.01); *G06F 3/0346* (2013.01); *G06F 3/0383* (2013.01); *G06F 3/04815* (2013.01); *G06F 2203/0384* (2013.01)

(58) Field of Classification Search
USPC .................. 345/156, 158, 168, 169
See application file for complete search history.

(56) References Cited

U.S. PATENT DOCUMENTS

| 4,787,051 | A | 11/1988 | Olson |
| 4,839,838 | A | 6/1989 | LaBiche et al. |
| 5,440,326 | A | 8/1995 | Quinn |
| 5,506,605 | A | 4/1996 | Paley |
| 5,703,623 | A | 12/1997 | Hall et al. |
| 5,825,350 | A | 10/1998 | Case, Jr. et al. |
| 5,898,421 | A | 4/1999 | Quinn |
| 6,072,467 | A | 6/2000 | Walker |
| 6,127,990 | A * | 10/2000 | Zwern ........................... 345/8 |
| 6,249,274 | B1 | 6/2001 | Svancarek et al. |
| 6,347,290 | B1 | 2/2002 | Bartlett |
| 6,545,661 | B1 | 4/2003 | Goschy et al. |
| 6,597,443 | B2 | 7/2003 | Boman et al. |
| 6,721,738 | B2 | 4/2004 | Verplaetse et al. |
| 6,754,596 | B2 | 6/2004 | Ashe et al. |

(Continued)

OTHER PUBLICATIONS http://www.gyration.com/us/tech/technology.htm.

(Continued)

*Primary Examiner* — Ilana Spar
*Assistant Examiner* — Jeffrey S Steinberg

(57) ABSTRACT

A device and method for interacting with a display using an accelerometer sensitive to tilt about two perpendicular axes and a third signal having a magnitude responsive to user input. The device and method allow a user to change a characteristic of an object on the display by converting pitch information, roll information, and a linear dimension into Cartesian coordinates for use by the display.

20 Claims, 7 Drawing Sheets

(56) References Cited

U.S. PATENT DOCUMENTS

| | | | |
|---|---|---|---|
| 6,847,351 | B2 | 1/2005 | Noguera et al. |
| 6,856,327 | B2 | 2/2005 | Choi et al. |
| 6,861,946 | B2 | 3/2005 | Verplaetse et al. |
| 2002/0178624 | A1* | 12/2002 | Yamamoto et al. ............. 37/348 |
| 2004/0070564 | A1 | 4/2004 | Dawson |
| 2004/0095317 | A1 | 5/2004 | Zhang et al. |
| 2004/0217941 | A1 | 11/2004 | Chen |
| 2004/0222976 | A1 | 11/2004 | Muresan et al. |
| 2004/0227725 | A1 | 11/2004 | Calarco et al. |
| 2005/0052414 | A1 | 3/2005 | Park et al. |
| 2005/0243062 | A1* | 11/2005 | Liberty ........................ 345/158 |
| 2006/0284839 | A1* | 12/2006 | Breed et al. ................... 345/156 |
| 2010/0194682 | A1* | 8/2010 | Orr et al. ...................... 345/156 |
| 2012/0026088 | A1* | 2/2012 | Goran .......................... 345/158 |

OTHER PUBLICATIONS http://www.polhemus.com/PATRIOT.htm.
http://www.polhemus.com/fastrak.htm.
http://www.ascension-tech.com/products/motionstarwireless.php.

* cited by examiner ize performing.
HAND-HELD WIRELESS ELECTRONIC DEVICE WITH ACCELEROMETER FOR INTERACTING WITH A DISPLAY This application is a Continuation-In-Part of U.S. patent application Ser. No. 12/590,897 filed 16 Nov. 2009 which claims benefit of U.S. Pat. No. 7,683,883 filed 31 Oct. 2005, which claims benefit of U.S. Provisional Patent Application Ser. No. 60/624,335 filed 2 Nov. 2004, the entire disclosures of which are incorporated by reference herein.

FIELD OF INVENTION

The present invention relates to the field of computer peripherals and controllers, examples of which include portable game consoles, add-ons to game-specific sports equipment, wearable electronics (such as gloves, goggles, glasses, bracelets, watches and helmets), handheld computers, and portable phones. One embodiment of the present invention relates to the control of 3D video games characters, home entertainment systems or more industrial applications such as robotics and the control of UAVs (unmanned aerial vehicles) and UGVs (unmanned ground vehicles). Specifically, one embodiment of the present invention relates to a method and apparatus for moving and controlling a cursor, an object, a character, or a mechanical system in a virtual or physical 3D environment. Examples of virtual or physical 3D environments can include remote displays and displays on handheld electronic devices such as Gameboys and portable phones. One embodiment of the present invention uses inertial sensing technology and an approach based on a mathematical representation of the 3D space with spherical coordinates, instead of the Cartesian representation mostly used in 3D applications.

BACKGROUND OF THE INVENTION

The tremendous computing power available at low cost in the early 21$^{st}$ century has made possible many computer applications that previously were unattainable because of the computational resources required. A prime example is three-dimensional modeling. To compute large three-dimensional models and to manipulate them in real-time requires large computational power, unless the models are very primitive. Today many applications, ranging from computer games with very high levels or realism to modeling of sub-surface geological formations are possible on even relatively mainstream computer systems.

A related trend is the merging of technologies such as televisions, home theatre, computers and game stations to produce PC Entertainment Centers. This trend is complemented by the drive towards 3D games and game environments. One challenge, however, is to make full use of the three dimensional environments by giving the users attractive tools to manipulate objects or characters of these three dimensional environments. These tools can be useful in two-dimensional environments because three-dimensional applications can be presented on two-dimensional (2D) displays.

In the two-dimensional computing world, the mouse has become a ubiquitous feature for allowing a user to move a cursor around in the two-dimensional space. Moving the cursor with the mouse can be used to find and select particular objects. There is a need to be able to move a cursor to objects located in three-dimensional space as well as the need to move objects or characters, characteristics in a 3D environment. This is much more challenging than moving a mouse across a tabletop as is the customary means for moving a cursor using a two-dimensional mouse.

In the prior art there are several known methods for moving a cursor in three-dimensional space. These include moving a receiver with respect to a field established by external beacons or emitters/receivers, with respect to acoustic, magnetic or optical signals that may be detected by the receiver. Problems with such approaches include the need for using external devices. The presence of external emitters/receivers is not always practical for portable and mobile devices. Such devices need to be self-contained, especially when the cursor or objects to be moved or object characteristic to be changed are on their attached screens. Using one or multiple inertial sensors for motion sensing is a way to make such devices self-contained.

Some other prior art solutions rely exclusively on gyroscopes to detect the movement of a 3D mouse, allowing the device to move a cursor in a 2D plane on the monitor. However, these solutions can lack the 3D capability that is needed when dealing with 3D environments.

From the foregoing it is apparent that there is a hitherto unmet need for a 3D pointing/controlling device that is self-contained, lightweight, and which uses low-cost components. The need is also apparent for a controlling device that could be used to remotely control mechanical systems such as Unmanned Air Vehicles (UAVs), UGVs Unmanned Ground Vehicles (UGVs), Unmanned Water Vehicles (UWVs) and other robotics systems, in a natural and efficient manner that is different from the method still followed today as represented by the control unit of model airplanes and the likes. One embodiment of the present invention can be used to address needs such as these.

BRIEF DESCRIPTION OF THE DRAWINGS

In the accompanying drawings.

DESCRIPTION OF THE EMBODIMENTS

Figure 1:
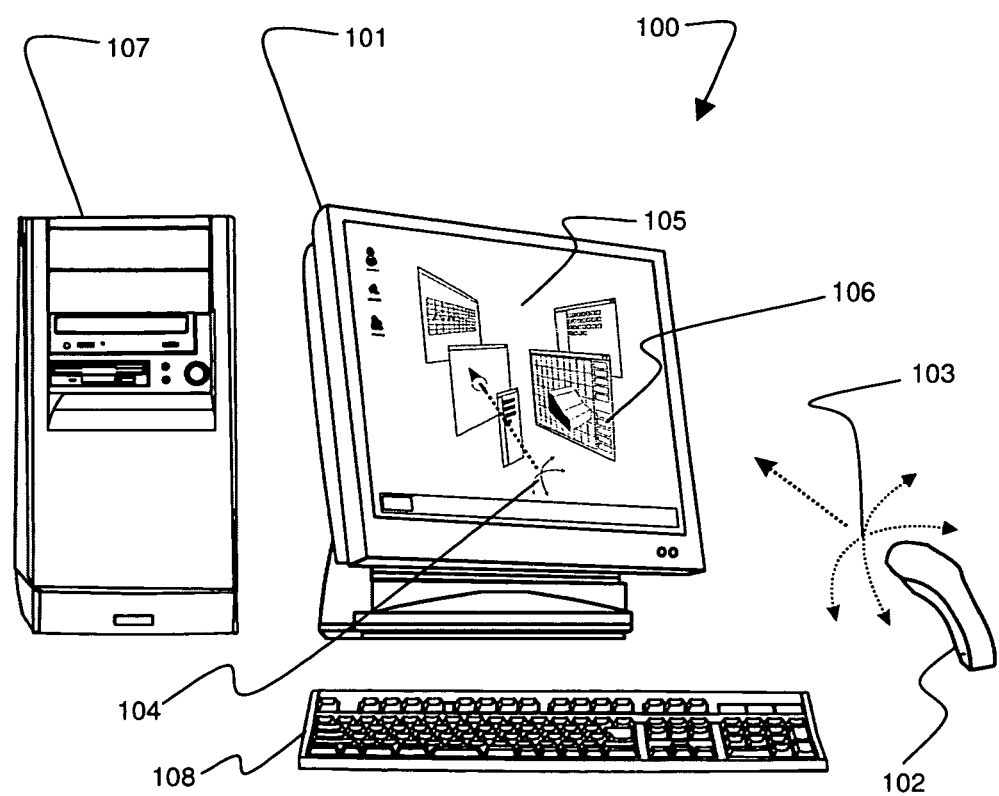
FIG. 1 shows a 3D input device used in a 3D computer system.

This invention is described in one embodiment in the following description with reference to the Figures, in which like numbers represent the same or similar elements or process steps. While this invention is described in terms of the best mode for achieving this invention's objectives in a particular application, it will be appreciated by those skilled in the art that variations may be accomplished in view of these teachings without deviating from the spirit or scope of the present invention.

For example, the present invention may be implemented using any combination of computer programming software, firmware, or hardware. As a preparatory step to practicing the invention or constructing an apparatus according to the invention, the computer programming code (whether software or firmware) according to the invention will typically be embedded in one or more machine readable storage devices such as micro-controllers, programmable logic and programmable analog devices, Flash memories, semiconductor memories such as ROMs, PROMs, etc., thereby making an article of manufacture in accordance with the invention.

The article of manufacture containing the computer programming code is used by either executing the code directly from the storage device, or by transmitting the code according to the present invention with appropriate standard computer hardware to execute the code contained therein. An apparatus for practicing the invention could be one or more devices having network access to computer program(s) coded in accordance with the invention.

One embodiment of the present technological innovation relates to pointing (I/O) devices used to position or manipulate a vectorial object. For example, the invention could be used to control an object (i.e. controlling object attributes such as position, orientation, and/or size) on a display for 2D or 3D environments. Vectorial objects can be vectorial cursors, graphical symbols, or any pictorial representation of physical or virtual object or character having one or multiple dimensions that has both a linear component (such as magnitude [or size], or position in a Cartesian space) and an angular component (such as orientation). In particular one embodiment of the present invention relates to handheld devices that can be used to position or manipulate a vectorial object such as a vectorial cursor or 3D objects/Characters in three-dimensional space. A vectorial cursor in 3D is the analog of a cursor in 2D. It is shaped like an arrow giving the user spatial feedback of the direction and position of the cursor. Depending on the application, the length of the arrow could be variable or fixed, whereby the arrow would be either extending from a spherical coordinates point of reference, or virtually moving in the 3D space. Thus, provided is an inertial sensor-based application related to a 3D Mouse that can act as a spatial pointer and can reach objects and icons in three dimensional environments and manipulate said objects, icons or characters. Such three dimensional environments could be generated by 3D graphical rendering or 3D GUIs with 2D monitors, volumetric monitors or stereoscopic and holographic monitors.

Such an embodiment of the present invention is based on inertial technology and methods that determine the position of a cursor in a 2D or 3D environment on a 2D or 3D display. This is achieved by mapping the movement of an operator's hand in space onto a polar coordinates frame of reference, thus optimizing the number of inertial sensors needed and reducing, manufacturing cost. In such an embodiment, the application of the technology uses a single accelerometer in a form factor allowing it to be used as a desktop mouse or freestanding remote controller or game controller. In addition to its role as a mouse for the interaction with 3D environments and 3D GUIs, the device/technology has the capability—in one embodiment—to act as a universal remote controller with both 2D and 3D interfaces of entertainment/media centers.

In another embodiment the same approach could be used with a glove-like application allowing the user to interact with both 2D and 3D environments by limited movements of the hand and/or fingers. In a further embodiment, it could also act as an advanced game controller for 3D games and could be coupled with haptic feedback. Furthermore, the method/technology could be applied in combination with portable game consoles (Gameboy, PSP . . . ) allowing players to interact with mobile games through movements of the console itself, in combination with triggers. This application is also useful with handheld computers and portable phones (such as cellular phones) allowing navigation through 2D or 3D interface menus by moving the device itself instead of using a stylus or the operator's fingers. Thus, the technology also has the capability to be embedded in various electronic devices including wearable and hand-held devices to generate motion signals for remote applications or built-in applications that can be rendered on an attached display. This means that embodiments of the present invention technology could be embedded in a portable/mobile media or communications devices, mobile phones, smartphones, and tablet computers. The technology could be used for things such as screen positioning and sizing, information exchange, and applications to remotely control consumer devices.

Another embodiment of the technology would be as an add-on to game-specific sports hardware for a new generation of sports games (examples of which include baseball bat, golf club, tennis racket, skateboard, skis, luge, running, cycling, football, soccer, basketball, etc.). In yet another embodiment, the technology could be applied for the control of UAVs and other remote controlled aircrafts and/or their embedded systems such as cameras/other detection equipment. The same embodiment is applicable to the control of model toys (aircraft, cars, boats, etc.). A person familiar with the art would also find that the technology has also applications in the field of medicine, engineering and sciences. It could be a virtual scalpel, a controller for a robotic arm, or a pointer for the manipulation of 3D molecules among other applications.

The present invention can provide a natural and ergonomic way to interact with 3D environments and to control systems in 3D space. This can be done by means of a 3-dimensional computer pointing and input device (3D Mouse/Controller) that uses a polar (spherical) coordinates approach implemented through the use of inertial technology (for example, an accelerometer that could be combined with other inertial sensors such as magnetic sensors and gyroscopes), to reach a point in 3D space and to control graphical symbols and animated characters in 3D environments.

The present invention can be implemented using a 3D Pointer concept. The three-dimensional pointer is achieved by using a spherical coordinate system. Its structure permits the user to access any point in his virtual environment by properly changing the device's directions and by increasing or decreasing the pointer length. The tilt angles, pitch and roll, captured from the accelerometer are used respectively as Alpha and Beta angles of the spherical coordinate system as illustrated in the equations below. While directions are captured from the hand movement by measuring the projection of the static gravity on the tilted accelerometer, the pointer length which is the physical analog of the radius R is simulated by using a trigger pair on the device or other haptic input such as other hand movements and or lateral/translational movement of the device. For example, the user can change its pointer in order to reach the desired three-dimensional point by pressing the increase and decrease triggers. An alternative is to use a time varying pointer length. As a result the instantaneous position of the pointer in the inertial frame can be expressed as a function of the time-varying radius and spherical angles.

$$X = R(t) \cdot \text{Cos}(\alpha) \cdot \text{Sin}(\beta)$$

$$Y = R(t) \cdot \text{Sin}(\alpha) \cdot \text{Sin}(\beta)$$

$$Z = R(t) \cdot \text{Cos}(\beta)$$

Like most 3D interfaces it is important to distinguish between the inertial frame and the user frames. The inertial frame is considered as a reference and all objects in the 3D virtual environment are expressed with respect to it. Thus this system is fixed. The x-axis is pointing to any convenient direction, the z-axis is pointing vertically upward and the y-axis is perpendicular to both. The user frame is the mobile system containing the pointer. It is defined by a rotation around the z-axis by $\psi$ and by the rotation around x and y by $\theta$ and $\Phi$. Moreover the distance between those frames defines the offset of the pointer with respect to the inertial frame. The figure below illustrates those rotations. The matrix linking between those two frames is the product of the following rotation matrix.

$$R = e^{(\hat{z} \times)\psi} e^{(\hat{y} \times)\theta} e^{(\hat{x} \times)\phi} = \begin{bmatrix} \cos(\psi) & -\sin(\psi) & 0 \\ \sin(\psi) & \cos(\psi) & 0 \\ 0 & 0 & 1 \end{bmatrix} \cdot$$

$$\begin{bmatrix} \cos(\theta) & 0 & \sin(\theta) \\ 0 & 1 & 0 \\ -\sin(\theta) & 0 & \cos(\theta) \end{bmatrix} \cdot \begin{bmatrix} 1 & 0 & 0 \\ 0 & \cos(\varphi) & -\sin(\varphi) \\ 0 & \sin(\varphi) & \cos(\varphi) \end{bmatrix}$$

After developing we get:

$$R_{IB} = \begin{bmatrix} \cos(\psi) \cdot \cos(\theta) & \cos(\psi) \cdot \sin(\theta) \cdot \sin(\varphi) - \sin(\psi) \cdot \cos(\varphi) & \cos(\psi) \cdot \sin(\theta) \cdot \cos(\varphi) - \sin(\psi) \cdot \sin(\varphi) \\ \sin(\psi) \cdot \cos(\theta) & \sin(\psi) \cdot \sin(\theta) \cdot \sin(\varphi) - \cos(\psi) \cdot \cos(\varphi) & \sin(\psi) \cdot \sin(\theta) \cdot \cos(\varphi) - \cos(\psi) \cdot \sin(\varphi) \\ -\sin(\theta) & \cos(\theta) \cdot \sin(\varphi) & \cos(\theta) \cdot \cos(\varphi) \end{bmatrix}$$

In one embodiment of the present invention the 3D interface is used to create the virtual reality scene needed to interact with the 3D pointer. This interface is developed in an expandable mode in order to permit any improvement in the future. This interface allows the user to interact with the 3D objects, to change the colors of the ground and the pointer, to change the render mode between wire frame, hidden, and rendered, to change the view angles and the light intensity, or any other object characteristic.

It is important to mention that the yaw angle can be changed directly from the pointing device in order to make the navigation easier. To avoid the use of additional sensing components, such as a magnetic sensor or gyroscope, it is possible to simulate the yaw dimension by a rotation of the field of view. This field of view rotation is a manipulation of the graphical perspective through the interface software, by a pair of control buttons on the device itself or by means of other user input. Thus, the yaw angle can be generated without a gyroscope, by using a gyroscope, by using a magnetic sensor, or by adding signals from multiple sensing components. Similarly, gyroscope pitch and roll signals could complement the pitch and roll signals generated by the accelerometer.

In one embodiment of the present invention we are using an inertial sensor to detect tilt accelerations that will then be converted into movement. In this particular embodiment, we are using a MEMS accelerometer developed by Analog Devices, the ADXL202E MEMS accelerometer. Any similar inertial sensor including thermal accelerometers could be used. The ADXL202E is a low-cost, low-power, complete two-axis accelerometer with a digital output, all on a single monolithic IC. The ADXL202E can measure both dynamic acceleration (e.g., vibration) and static acceleration (e.g., gravity). The outputs are analog voltage or digital signals whose duty cycles (ratio of pulse width to period) are proportional to acceleration. A microprocessor counter, without an A/D converter or glue logic, can directly measure the duty cycle outputs. The duty cycle period is adjustable from 0.5 ms to 10 ms via external timing resistor.

The ADXL202E is a complete, dual-axis acceleration measurement system. For each axis, an output circuit converts the analog signal to a duty cycle modulated (DCM) digital signal that can be decoded with the timer port of the microprocessor used. The ADXL202E is capable of measuring both positive and negative accelerations to at least ±2 g. The accelerometer can measure static acceleration forces such as gravity, allowing it to be used as a tilt sensor as used in our application. Acceleration will result in an output square wave whose amplitude is proportional to acceleration. Phase sensitive demodulation techniques are then used to rectify the signal and determine the direction of the acceleration.

One of the most popular applications of the ADXL202E is tilt measurement. An accelerometer uses the force of gravity as an input vector to determine orientation of an object in space. An accelerometer is most sensitive to tilt when its sensitive axis is perpendicular to the force of gravity, i.e., parallel to the earth's surface. At this orientation its sensitivity to changes in tilt is highest. When the accelerometer is oriented on axis to gravity, i.e., near its +1 g or −1 g reading, the change in output acceleration per degree of tilt is negligible. When the accelerometer is perpendicular to gravity, its output will change nearly 17.5 mg per degree of tilt, but at 45° degrees it is changing only at 12.2 mg per degree and resolution declines. Due to the fact that it is sensible to the static gravity, it can be used to measure especially Tilt angles (Pitch and Roll) just by measuring the projection of the vector g over each axis of the accelerometer.

When the accelerometer is oriented so both its X and Y axes are parallel to the earth's surface it can be used as a two axis tilt sensor with a roll and a pitch axis. Once the output signal from the accelerometer has been converted to an acceleration that varies between −1 g and +1 g, the output tilt in degrees is calculated as follows:

$$\text{Pitch} = A\text{Sin}\left(\frac{Ax}{1g}\right)$$

$$\text{Roll} = A\text{Sin}\left(\frac{Ay}{1g}\right)$$

In one embodiment of the present invention the 3D mouse/controller is a hand held device that captures the movement of a hand in free space and controls the movement of a vectorial cursor, object or character in an application on a monitor, or a system in physical space. The 3D mouse/controller uses an inertial sensor. This technology allows the 3D Mouse/Controller to be self-contained without the need for beacons or emitters/receivers to detect generated signals, as the case would be with acoustic, magnetic or optical approaches. The technology can be complemented by acoustic, magnetic or optical sensing technologies in certain situations.

More specifically the controller can be a hand-held device that captures the movement of a hand in free space and controls the movement of a cursor, a button, an icon or any object or modifies object characteristics, on a display such as an LCD, LED or Plasma monitors or TV sets. The display may be remote or attached to the device. The control signal is relayed via a wired connection or via Infrared, Bluetooth, RF, or any other wireless technology such as near field communication in proximity-based applications.

Practically, it could be either used as a mouse for 3D GUIs and volumetric monitors, a controller for 3D games, a pointer for interactive presentations or as a remote controlling device for the upcoming PC Entertainment Centers that would combine a TV with a Computer and a Home Theatre. Its range only depending on that of the wireless technology used. In an alternative embodiment, the 3D Mouse/Controller is a wired device connected electrically to a computing device.

This control functionality could be extended to controlling more household peripherals such as telecommunications, lighting, irrigation, security system, heating/cooling or even car start-up in the morning. This would be done through a software user interface (Windows, Linux etc.) that would appear on a display such as a large Plasma (or other) screen with this screen playing the role of a TV, computer monitor and command and control interface.

In this respect, the 3D Mouse/Controller could be the future universal remote controller for the next generation of consumer appliances that would be controlled through a central computer (network of computers), instead of each having its own micro-controller and remote controlling device. The complexity of remote controllers would then be in the software interface that would be made more intuitive (and ideally in 3D) than the scroll down menu interface and large number of buttons currently available.

As the 3D Mouse/Controller also has a spatial capability with the needed degrees of freedom, it is a suitable device for the new generation of 3D monitors (e.g., Stereographic, Holographic and Volumetric). There is a number of companies developing such monitor technologies in the US, Europe and Asia and their feedback is that they still lack a practical/affordable 3D Mouse/Controller that would allow operators to navigate easily in the 3D environment.

The 3D capability is achieved through a limited amount of hand movements (such as rotations and translations) that would allow the alignment of a feedback vector (vectorial cursor) with the object to be reached, on the monitor. Practically, the alignment is done by varying the vertical and horizontal angles of the ray, in a polar frame of reference. Once the alignment is achieved, the 3D Mouse allows the extension of the ray whereby it would reach the object, thus enabling it for further manipulation. This approach allows an optimization of needed electronics whereby only one inertial device is needed for the basic 3D functionality.

The 3D capability of the device would also enable a new generation of Virtual reality applications (in this case a haptic feedback might be added), Industrial and military simulations, advanced 3D CAD/CAM design, Medicine, Molecular Chemistry, Bio-informatics, etc. For these types of applications, the self-contained and wearable characteristic of the technology would be a strong enabling factor.

One particular embodiment of the invention, relying on its wearable characteristic and with applications in Medicine, Virtual Reality, Military and Industry is a digital glove (i-glove, e-glove). Such a glove would allow consumer, military, medical, and industrial users a seamless interaction with physical and virtual displays and objects, including the activation of virtual push buttons, knobs, and the selection, activation and manipulation of icons and virtual objects, characters of various forms and shapes or object characteristics.

In gaming and simulation applications, the e-glove will allow users the use of actual sports or military equipment to simulate operation in a virtual environment. For example, soldiers will use their own gear in a serious gaming environment for group training in realistic conditions. Sports players would use their own gear for virtual training and coaching.

In another application, the e-glove will enable real-life simulation of medical surgeries and other medical interventions for surgical preparation or teaching applications. In this application the technology may be coupled with haptic feedback allowing the users to operate on virtual bodies and organs. These bodies and organs would be accurate rendering from the actual patients organs, rendered through high-resolution 3D imagery of the patient's body.

In one industrial application, the e-glove will allow the remote control of a five-fingered robotic arm in a natural manner. While having visual feedback from the scene of operation, the operator will move his hand using translational, rotational, flexing and grasping movements. These movements and gestures will be conveyed wirelessly or via a wired link to the robotic arm, allowing the operator to accurately and naturally control the movement of the robotic arm and its individual fingers.

In a particular application in aviation, the e-glove will enable air crew men with virtual typing and virtual sign capability and that of annotating the real world with hand-motions that become geo-registered icons on the displays of all air crews and ground team members simultaneously. Technically, the glove could incorporate at least one accelerometer. More accelerometers may be required in the case of a fingered robotic arm. A gyroscope, and a magnetometer may be useful additions to improve tracking of the translational, rotational, flexing and grasping movements of the hand and arm wearing the glove. This can allow the hand to navigate within the frame of a 3D GUI (graphical user interface) if needed, and to activate switches and buttons on different planes of the virtual interface in use. At least one of the glove fingers can incorporate a sensor that can control a virtual cursor in 3D space. The finger can be able to move the virtual cursor to activate icons that could be rendered with a 3D GUI. It will also enable users to type commands, reports etc., by a simple movement of the fingers in air or light taping on a solid surface.

The length of the glove fingers may be lined with fiber optics or Neoprene bend sensors to sense the bending of the fingers. This would complement the sensors in the fingers allowing an accurate sensing of the fingers flexion for accurate control of robotic arms or full-fingers typing. The tip of at least three fingers could incorporate infrared LEDs to be used with camera-based motion-sensing technology to complement the self-contained motion sensing capability of the e-glove. For typing applications, a system of texting similar to the one in mobile phones where each finger would be able to selectively type different characters and numerals may be implemented. A photoelectric virtual keyboard is another option but lacks the self-contained capability of our approach. This typing application could be extended to consumer devices such as tablets enabling users with wearable keyboard capability, allowing them to type like on a regular keyboard, and needing only a hard surface.

In consumer and aviation applications, the e-glove can use existing camera technology to detect the triangular movement of the LEDs, allowing an accurate gesture and movement tracking in space. In the aviation application, the e-glove may be used with the cameras that are pervasive within the cockpits of advanced jet fighters. These cameras are used among other things to track the movements of pilot's helmets and adjust the view of weapons cameras accordingly. The same cameras could be used with the e-glove's infrared technology to detect the movement of the gloves and pilots gestures or parts thereof (individual fingers).

This 3D capability is also an enabling factor for the next generation of game stations and game environments. A game controller enabled by this 3D technology will be able to control characters (including their sizes, shapes, positions, orientations, and other characteristics such as speed and acceleration), in a 3D space or a 2D environment, with very natural movements.

In one particular embodiment, the technology could be embedded in a portable/mobile game device/system (similar to Gameboy, PSP, etc.) or portable computer and phone applications mentioned previously, adding 3D capability and control through hand movements and allowing the advent of 3D games controlled through movements of the game system itself, thus starting a paradigm shift in portable game systems.

In another embodiment, the technology could be embedded in game controllers with the shape of sports equipment, (non-extensive list including golf clubs, tennis racquets, baseball bats, and/or boxing gloves), thus allowing the creation of even more realistic video games around sports themes. Similarly, the technology could be embedded in actual sports and tactical equipment, including wearable ones (gloves, goggles/glasses, helmets and shoes), allowing real-life sports or tactical simulation in a realistic environment. For example, the technology could be embedded in sports and military helmets to measure the rotational and translational effect of impacts on the helmet and the athlete's head. The technology could be combined with at least one gyroscope and one or more impact sensors such as three sensors for measuring movement in orthogonal directions or measuring orthogonal rotations). The sensor technology could be in the form of accelerometers capable of sensing impacts as well as detecting the magnitude, location and direction of the impact. A temperature sensor and GPS sensor could also be included. A memory module would be included for the stocking of generated data and a communications module included for the transmission of said data. In a performance related sports application, the technology embedded in a wearable form can detect the translational acceleration, speed and movement of the athletes, allowing side-line personnel to assess the performance and well-being status of each player in order to define the best game strategy.

In tactical, as well as cycling and motorcycling applications or any other motion sports requiring wearable equipment like helmets, gloves and goggles/glasses, such as horse riding, paragliding, parachuting and similar sports, the technology could be embedded in said helmets or goggles/glasses. The additional sensors might include at least one gyroscope, at least 1 impact detector or accelerometers capable of detecting impact, a GPS receiver as well as sensors to monitor physiological and vital signals including but not limited to temperature, EEG, EKG, Pulse and similar physiological signals. A communications module will also be included, allowing the transmission of rotational and translational movements of the helmet, the related acceleration/deceleration of the head as well as the position of the wearer and the generated physiological and vital signals. Signal transmission includes wired, wireless and satellite communications.

Other applications can include a remote controller for hobbyists or for military personnel tele-guiding flying entities such as Unmanned Air Vehicles (UAVs), Unmanned Ground Vehicles (UGVs), or Unmanned Water Vehicles (UWVs). Unmanned Systems can use inertial measurement unit (IMUs), which detect pitch, roll and yaw movement from one or more sensors. The use of multiple sensors generally makes the movement sensing more accurate and responsive.

In a related remote control application, the technology would be embedded in a hard shell impervious to nature's elements including water, dust and sand, allowing unmanned systems operators to reduce training time and naturally control their unmanned systems. In these types of applications, the controller could be complemented by a first person viewer system in the form of an attached camera to the unmanned system relaying a field of view to the operators via a set of goggles worn by the operator. Additional linear inputs on the device can allow a real time control of the mounted camera increasing the operator's field of view.

Wireless communications protocols such as WiFi, Bluetooth, and Near Field Communications (NFC) can be combined with other elemets of the present invention for a variety of applications. One example is that a portable phone with motion sensing technology could operate as a key for opening a lock in a gate or as a gate opener whereby a rotation or tilting motion is transmitted along with the phone ID to a tag controlling a mobile lock via NFC. In hand-held gaming consoles enabled with motion sensing capability, NFC could enable motion-based multiplayer games in which players would bump their game consoles to connect to a virtual local gaming network or would need to touch various NFC tags in a road rally. Wearable motion sensing modules enabled with NFC and embedded into sports equipment such as helmets, gloves, or shoes can provide information about the performance level and health status of athletes or the intensity of impact when coming into contact with devices having NFC tags. Wearable motion-sensing modules can also enable sports, training, or simulation environments such as two seniors walking or running on adjacent treadmills could be controlling characters running at proportional speeds in a countryside landscape with a virtual game-based landscape rendered on a display. Portable phones having motion sensing capability and NFC could be used to give or take money from a digital account based on specific motions of the phone such as an upward stroke meaning "upload money" and a downward stroke meaning "download money".

From a marketing perspective, the field seems ripe for the technology, especially technology that has been designed to be manufactured cost-effectively. One embodiment of the present invention relies on Bluetooth wireless communications and RS 232 connectivity. It is also possible to have wired USB connectivity and Wi-Fi (wireless) communications or any other enabling technology capable of being understood by anyone skilled.

FIG. 1 shows a 3D computer system at 100. Referring to FIG. 1, a computer is shown at 107, a computer monitor is shown 101, and a computer keyboard is shown at 108. A 3D environment 105 and a set of 3D applications 106 are shown within the monitor 101. A 3D input device or Mouse/Controller 102 interacts with the 3D environment 105 by controlling a vectorial cursor 104. In the example shown here, the vectorial cursor 104 is shaped like an arrow giving the user spatial feedback of the direction and position of the cursor. Depending on the application, the length of the arrow could be extensible or fixed. In the embodiment shown here, the base of the arrow is a fixed origin of a spherical coordinate system and changes in the length of the vectorial cursor 106 are controlled through a linear input element comprising a pair of buttons on the input device 102, allowing a user to reach any point in the space depicted on the monitor 101. In an alternate embodiment, the location of the base of the arrow can be controlled through the input device allowing the entire arrow, or vectorial cursor 104 to move virtually in the 3D space, with the length of the arrow being either fixed or responsive to user input through the 3D input device. A linear input element used in such an input device 102 can be any single or multiple user-responsive components understood by anyone skilled in the art. Examples of linear input elements include a pair of push buttons, a slide switch, a touch pad, and a scroll wheel.

It should be noted that a computer system could be any system that includes an information-processing unit. Examples of computer systems include, but are not limited to personal digital assistants (PDAs), personal computers, minicomputers, mainframe computers, electronic games, and microprocessor-based systems used to control personal, industrial or medical vehicles and appliances.

The movement and control functions of the 3D Mouse/Controller 102 are shown as phantom lines at 103. The curved lines and arrows at 103 represent possible movements of the device held by the user. An upward or downward tilt (pitch) of the device would move the vectorial cursor 104 in a similar fashion on the screen, while a lateral tilt (roll) in a left-right manner would move the vectorial cursor 104 on the screen to the left or right. The magnitude of the vectorial cursor 104 is controlled using a pair of control triggers on the device. The combination of pitch, roll, and vector magnitude allow the user to reach any point in 3D space using spherical coordinates with a minimal amount of physical movement.

In one embodiment illustrated in FIG. 1, the 3D Mouse/Controller 102 is pointing at 3D applications 106 in 3D graphical user interface (GUI) 105 that are displayed on a monitor 101. In another embodiment, the 3D Mouse/Controller 102 could control one or more 3D graphical objects in a 3D games environment in the same manner. A graphical object can be a video game character or any other graphical symbol in a 3D environment. In that case, the physical embodiment of the controlling device 102 could look like a game controller and the 3D character would be substituted for the vectorial cursor 103. The vector magnitude derived from a linear input element in the Mouse/Controller 102 can be used to control the size or orientation of the graphical object.

In another embodiment, the Mouse/Controller 102 is a 2D input device working in radial coordinates. In this case, only one tilt angle and a minimum of one linear input are measured in the input device 102 to provide a 2D navigational device operating in radial coordinates. In yet another embodiment, the Mouse/Controller 102 is an input device with two linear input elements capable of changing a vector magnitude in perpendicular axes. These two perpendicular axis in conjunction with one tilt axis can generate a position in 3D space using cylindrical coordinates.

Figure 2A:
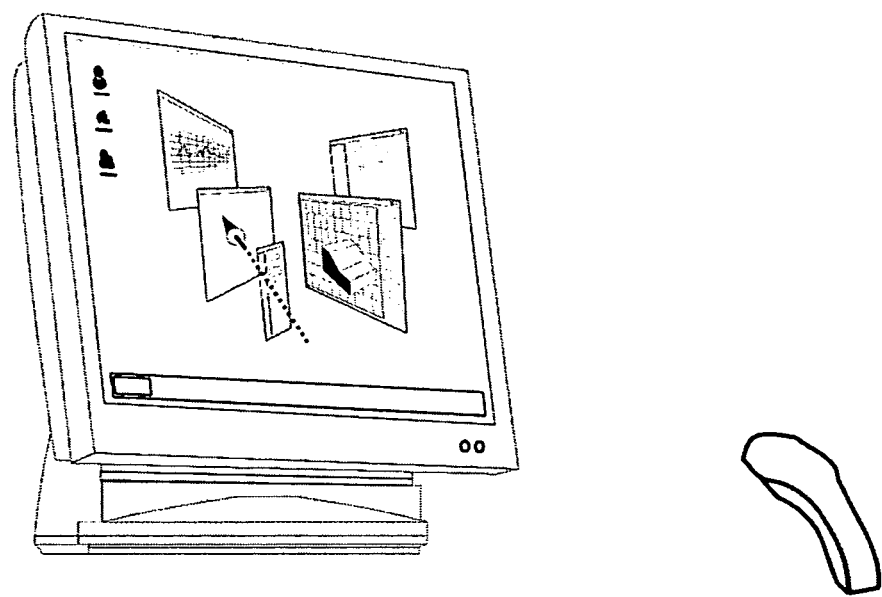
FIG. 2A shows the system of FIG. 1 with the 3D input device in a resting position and a vectorial cursor pointing at one object in the 3D environment.
Figure 2B:
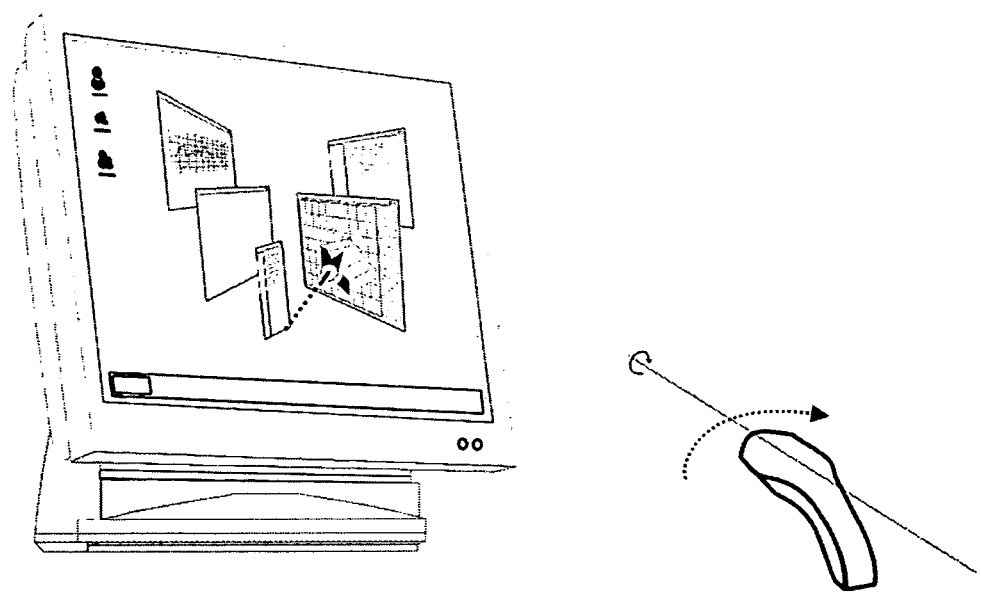
FIG. 2B shows the system of FIG. 1 with the 3D input device being tilted along the roll axis.
Figure 2C:
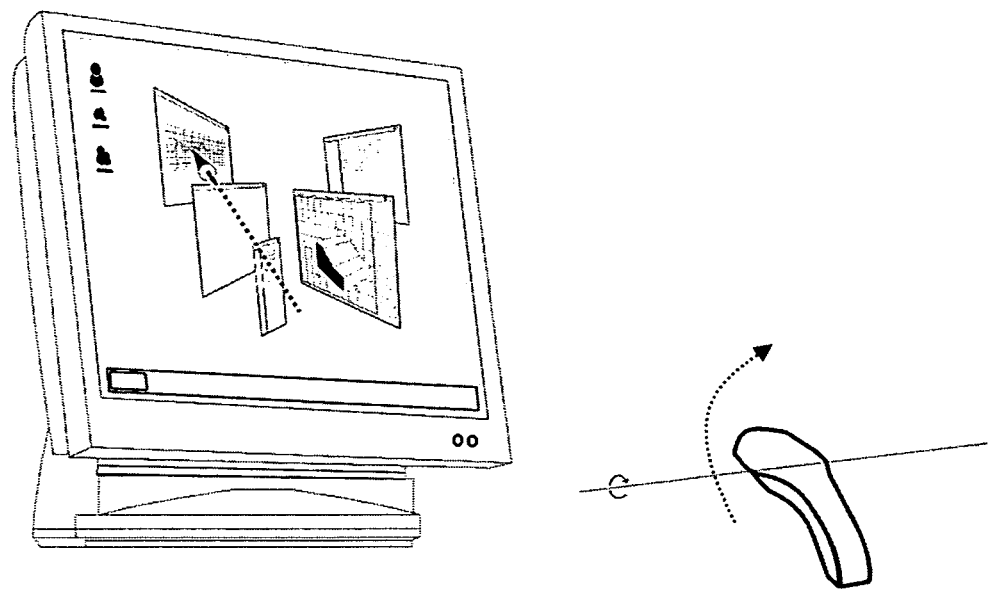
FIG. 2C shows the system of FIG. 1 with the 3D input device being tilted along the pitch axis.
Figure 2D:
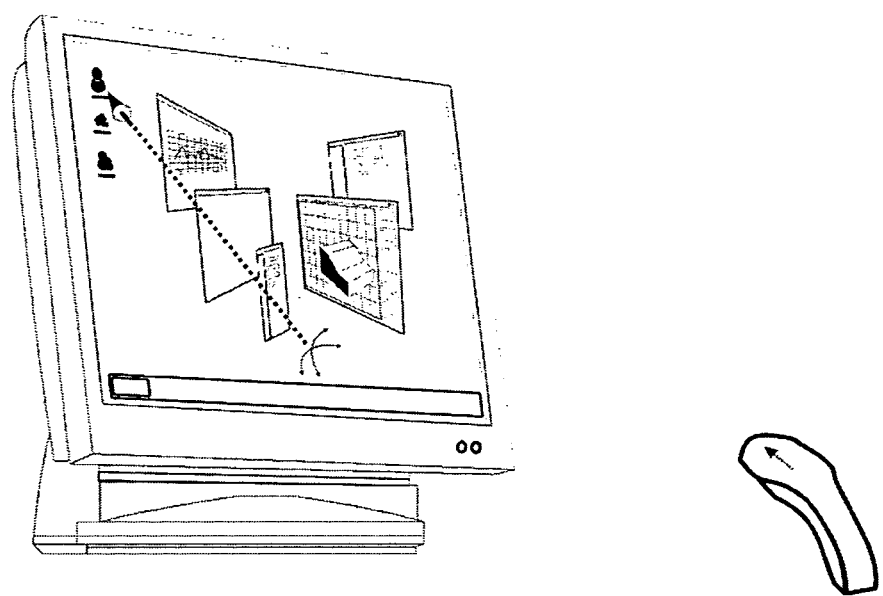
FIG. 2D shows the system of FIG. 1 with the vectorial cursor moving toward an object on the 3D display in response to linear input on the 3D input device.

FIGS. 2A, 2B, 2C, and 2D show the detailed movement of the 3D Mouse/Controller 102 and the related control of the vectorial cursor 104. FIG. 2A shows the initial state of the device 102 and vectorial cursor 104 pointing on one application 106. FIG. 2B shows a right rolling tilt of the device 102 that causes the vectorial cursor 104 to move right and point to another application 106 to the right of the initial one in FIG. 2A. FIG. 2C shows an upward tilt of the device 102 that causes the vectorial cursor 104 to move up and point to another application 106 above of the initial one in FIG. 2B. FIG. 2B shows the extension function through a button on the device 102 that causes the vectorial cursor 104 to move further inside the 3D GUI 105 and point to an icon on the desktop 106 above of the application one in FIG. 2C.

FIG. 2A, 2B, 2C are the actual rendering of the device movements and vectorial cursor control as described in FIG. 1. Namely, an up-down tilt of the device will move the cursor in an upward or downward manner. Similarly, a left-right tilt of the device would move the vectorial cursor to the left or the right. Finally, the vectorial cursor would move forward or backward through the depression of a pair of triggers on the device itself that controls its spatial extension and retraction.

Figure 3:
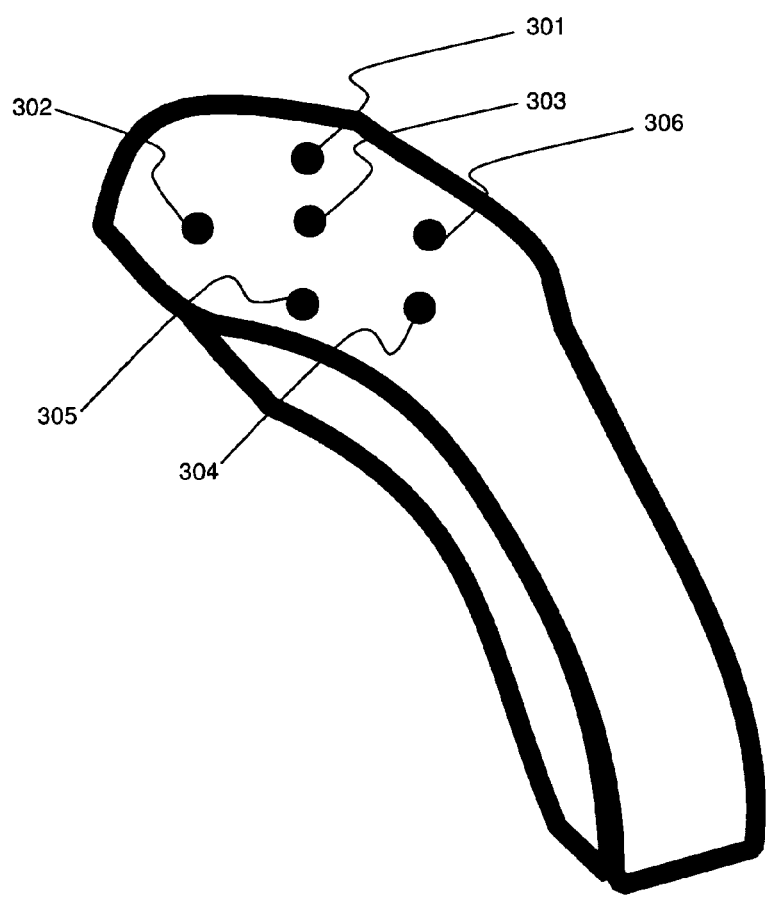
FIG. 3 shows one embodiment of the 3D Mouse/Controller with the knobs and buttons used for interaction with a 3D environment.

FIG. 3 shows one physical embodiment of the 3D Mouse/Controller with the knobs and buttons used for interaction with a 3D environment. One pair of buttons 301/302 is the equivalent of the left and right clicks of a regular mouse. They activate similar functions. A second pair of buttons (triggers) 303/304 enables the extension and retraction of the vectorial cursor to reach different parts of a 3D environment, by increasing the module of the vectorial cursor. The vectorial cursor being the physical analog of a spherical vector, the buttons actually increase/decrease the module of the vector which is rendered on the screen by a movement of the vectorial cursor forward or backward.

A third pair of buttons 305/306 allows the user to change the field of view or "perspective" of a 3D scene, in order to simulate the Yaw dimension. This is done by graphically changing the field of view through a graphical transformation in the interface software. The action is controlled by another pair of triggers on the device.

Figure 4:
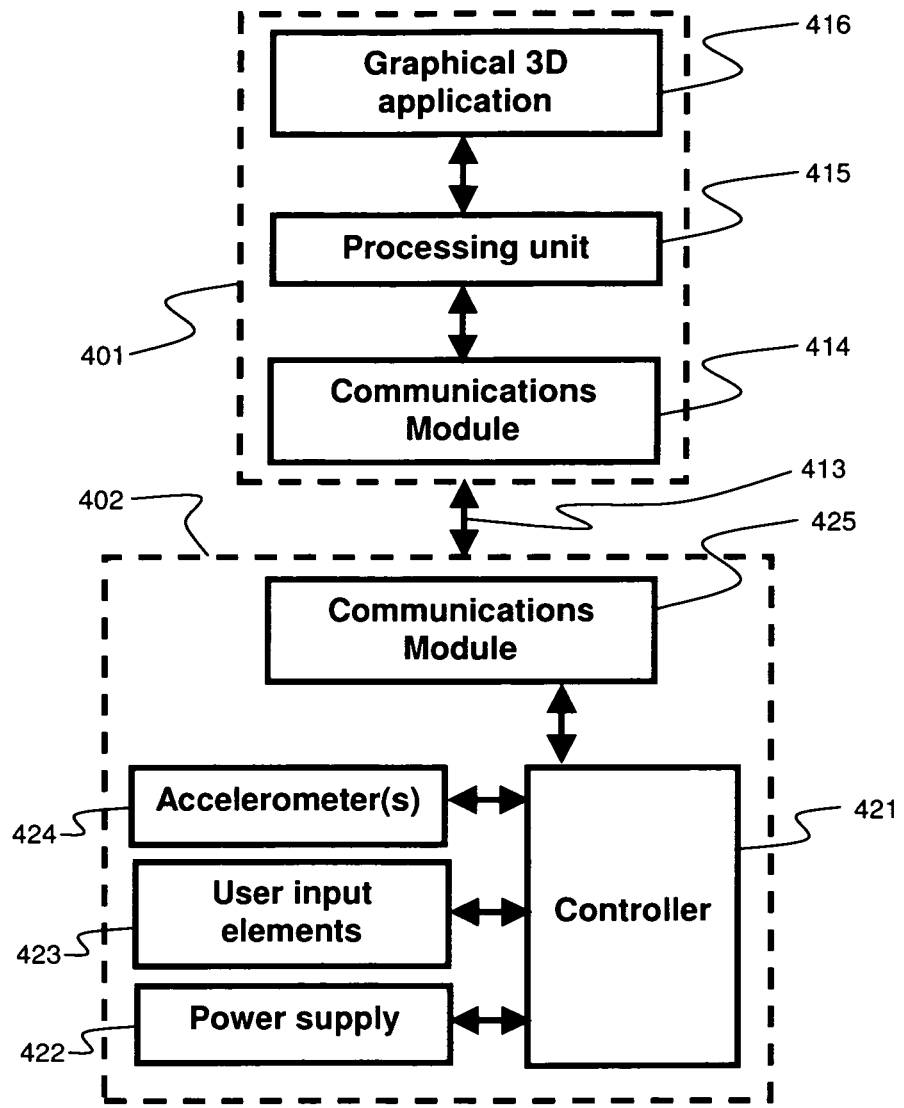
FIG. 4 shows a block diagram of the 3D Mouse/Controller system and the way it interacts with a 3D application on the computer monitor, through interrelated modules performing the different functions of: Movement Sensing, Sensing data interpretation and conversion to digital data, Wireless Communication of the data to an interface, Graphical rendering of the data in a 3D application.

FIG. 4 shows a block diagram of one embodiment of the 3D Mouse/Controller system. The system comprises an input device (which can also be a hand-held pointing device or a 3D Mouse/Controller) 402 and a display control unit module 401. The input device includes an inertial sensor (accelerometer) 424 operable to detect an acceleration as the user tilts the pointing device in at least one direction; a power supply 422 (which can be a battery, AC power supply, solar cell or any other source of electrical power understood by anyone skilled in the art), a selection unit 423 that comprises a set of user input elements and circuitry to collect the elements activity and allow the user to:

select a command identifier on the display the same way a user would do with the right and left click buttons of a 2D mouse;

control the vectorial cursor location through a pair of triggers that extends the magnitude of the spherical radius R which is the mathematical representation of the vectorial cursor; and control the field of view of a 3D application.

In one embodiment, the hand-held pointing device 402 also includes a controller 421 based around a microcontroller and digital signal processor, a field programmable gate array, programmable logic devices, and other related control circuitry well understood by anyone skilled in the art. The controller 421 is connected to the accelerometer 424, the selection unit 423 and the power supply 422. The controller 421 is programmed to receive accelerometer data and to compute tilt angles based on the accelerometer data. The controller 421 is also programmed to receive trigger signals from the selection unit and to compute a vector magnitude and field of view translation in response to the trigger signals. The circuit also manages the battery or other power source 422 and optimizes power consumption for the system. In one embodiment, the hand held pointing device further includes a communications module 425 that converts computed data into communication protocols to be dispatched to a host computer via a wireless (or wired) connection 413;

Further referring to FIG. 4, the display unit control module 401 in one embodiment of the present invention includes a communications module 414 to receive the orientation data and user selection activity data transmitted from the handheld pointing device; and a processing unit 415 comprising a microprocessor, a digital signal processor, memory modules and a driver that interprets communicated data to be viewed by a software interface (graphical 3D application) 416; wherein the software interface gives a graphical rendering of dispatched and interpreted data.

Thus, a method and apparatus for interacting with virtual and physical 3D environment by means of a novel 3D Mouse/Controller is disclosed. These specific arrangements and methods described herein are merely illustrative of the principals of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A hand-held wireless electronic device for interacting with a display, the device comprising:
a MEMS accelerometer responsive to tilt of the device in a plurality of axes wherein:
the accelerometer comprises an integrated circuit that generates a digital tilt signal responsive to the projection of static gravity on the tilted accelerometer;
the accelerometer is most sensitive to tilt when the accelerometer is perpendicular to gravity; and
the digital tilt signal comprises an accelerometer pitch signal and an accelerometer roll signal where pitch and roll are rotations about two perpendicular axes orthogonal to the gravitational vector;
a sliding user input element that generates sliding input electrical signal having a magnitude responsive to a user-imparted sliding motion on the hand-held device, wherein the sliding user input element does not comprise an accelerometer;
a digital electronic circuit connected to the accelerometer and connected to the sliding user input element wherein the circuit:

calculates accelerometer pitch information using an inverse trigonometric function in response to said accelerometer pitch signal;
calculates accelerometer roll information using an inverse trigonometric function in response to said accelerometer roll signal;
calculates line magnitude information in response to the sliding input electrical signal;
calculates a display vector orientation in response to the accelerometer pitch information and the accelerometer roll information without using a signal from a gyroscope;
calculates a display vector length in response to the line magnitude information; and
calculates yaw information;
a communications module electrically coupled to the electronic circuit wherein:
the communications module communicates the display vector orientation to a receiving element of the display;
the communications module communicates the display vector length to a receiving element of the display;
the communications module communicates the yaw information to a receiving element of the display; and
the communications module further comprises a wireless communications element using a digital serial data transmission signal;
a battery that powers the accelerometer, the sliding user input element, the digital electronic circuit and the communications module; and
a circuit that manages the battery and optimizes power consumption for the device.

2. The hand-held wireless electronic device of claim 1 wherein:
said inverse trigonometric functions used to calculate the accelerometer pitch information and the accelerometer roll information on the hand-held wireless device comprises arcsin functions;
the calculation of the display vector orientation and the display vector length from the accelerometer pitch information, the accelerometer roll information, and the sliding input electrical signal further comprises:
a calculation of a spherical vector orientation in a 3-dimensional spherical coordinate system in response to the accelerometer pitch information and the accelerometer roll information without using a signal from a gyroscope;
a calculation of a spherical vector length in the 3-dimensional spherical coordinate system in response to the line magnitude information without using a signal from a gyroscope; and
a coordinate system transformation from the 3-dimensional spherical coordinate system to a 3-dimensional Cartesian coordinate system using Euler angles wherein:
a first Euler angle is responsive to the accelerometer pitch information;
a second Euler angle is responsive to the accelerometer roll information; and
the coordinate system transformation uses a radius measurement responsive to the line magnitude information from the sliding user input element.

3. The hand-held wireless electronic device of claim 2 wherein:
the arcsin function further comprises calculation of the accelerometer pitch information and calculation of the accelerometer roll information from the tilt angles according to the following equations $$\text{Pitch} = \text{ArcSin}\left(\frac{Ax}{1g}\right)$$

$$\text{Roll} = \text{ArcSin}\left(\frac{Ay}{1g}\right)$$

where Ax is the rotational acceleration of the MEMS accelerometer in a selected direction parallel to the earth's surface, Ay is the rotational acceleration of the MEMS accelerometer in a second direction parallel to the earth's surface that is perpendicular to the direction defined by Ax, and g is gravity;
the coordinate system transformation using Euler angles further comprises expressing the display vector orientation and the display vector length in an inertial reference frame in 3-dimensional Cartesian coordinates as a function of the line magnitude information, the accelerometer pitch information, and the accelerometer roll information by using the following three equations:

$$X = R(t) \cdot \text{Cos}(\alpha) \cdot \text{Sin}(\beta)$$

$$Y = R(t) \cdot \text{Sin}(\alpha) \cdot \text{Sin}(\beta)$$

$$Z = R(t) \cdot \text{Cos}(\beta)$$

wherein X, Y, and Z represent a location in a 3-dimensional Cartesian coordinate domain presented on the display wherein X, Y and Z also have the same origin as a 3-dimensional spherical coordinate domain defined by the display vector length R(t) responsive to the sliding element electrical signal, $\alpha$ is an angle representing the longitudinal relationship between R(t) and the ZX plane in the 3-dimensional Cartesian coordinates that is responsive to the accelerometer pitch information, and $\beta$ is an angle representing the colatitudinal relationship between R(t) and the Z axis that is responsive to the accelerometer roll information;
the device further comprises the display, wherein the display further comprises the display screen;
the display comprises a stereoscopic monitor;
the MEMS accelerometer is an ADXL202E;
the sliding input element is a virtual slide switch;
the magnitude of the sliding input electrical signal is responsive to the time the virtual slide switch is turned on;
device further comprises an inertial sensor that generates a yaw signal about an axis substantially aligned with the gravitational acceleration vector wherein the inertial sensor comprises a gyroscope based on MEMS technology;
the yaw information calculated by the electronic circuit is responsive to the yaw signal;
the yaw information is configured to horizontally rotate the field of view on the display screen;
the digital serial communications protocol used by the wireless communications element comprises a near field communication protocol;
the hand-held wireless device is configured to sense impact;
the device is used in a sports application;
the device comprises a glove; and
the device is used in boxing.

4. The device of claim 1 wherein the device further comprises the display screen.

5. The device of claim 1 wherein the device comprises a wearable glove.

6. The device of claim 1 wherein:
the digital serial communications protocol used by the wireless communications element of the hand-held wireless device:
  is selected from the group of Bluetooth and WiFi; and
  is configured for transmitting the display vector orientation, the display vector length, and the yaw information to the display using the digital serial communications protocol
the display is an external 2-dimensional display not located on the hand-held device; and
the sliding input element is a virtual slide switch;
the magnitude of the sliding input electrical signal is responsive to the time the virtual slide switch is turned on.

7. The device of claim 1 wherein:
an input selected from the group of the display vector orientation and the display vector length is used to determine a characteristic of an object presented on the display selected from the group of a field of view rotation, an object rotation, an object size, and an object color; and
the digital serial communications protocol used by the wireless communications element further comprises communication of said object characteristic.

8. The device of claim 1 wherein said sliding user input element comprises a virtual sliding user input element.

9. The device of claim 1 wherein:
the device further comprises a second user input element wherein the second user input element is responsive to a translation motion of at least part of the device;
the digital electronic circuit is connected to the second user input element;
the digital electronic circuit calculates display vector location information in response to the second user input element; and
the communication module communicates the display vector location information to the display.

10. The device of claim 1 wherein:
the device further comprises a second user input element;
the second user input element generates a yaw signal in response to a rotation of at least part of the device;
the digital electronic circuit is connected to the second user input element;
the digital electronic circuit generates field of view rotation information in response to the yaw information, wherein the field of view rotation information comprises a rotation of a virtual scene on the display in a horizontal plane; and
the communication module communicates the field of view rotation information to the display.

11. The device of claim 1 wherein:
the sliding user input element is a physical sliding user input element;
the device further comprises an inertial sensor that generates a yaw signal about an axis substantially aligned with the gravitational acceleration vector and wherein said inertial sensor comprises a gyroscope;
the display is a stereographic display; and
the display is external to the device.

12. The device of claim 11 wherein said inertial sensor comprises a gyroscope based on MEMS technology and wherein the yaw output of the gyroscope is configured to change a characteristic of an object presented on the display selected from the group of a field of view rotation, an object rotation, an object size, and an object color.

13. A portable device for manipulating a pointer in Cartesian space on a two-dimensional display, the device comprising:
- an accelerometer responsive to tilt of the device in a plurality of axes wherein:
  - the accelerometer comprises a circuit that generates a tilt signal responsive to the projection of static gravity on the tilted accelerometer;
  - the accelerometer is most sensitive to tilt when the accelerometer is perpendicular to gravity; and
  - the tilt signal comprises an accelerometer pitch signal and an accelerometer roll signal where pitch and roll are rotations about two perpendicular axes orthogonal to the gravitational vector and wherein the accelerometer pitch signal and the accelerometer roll signal are generated without using a sensor responsive to a gyroscopic effect;
- an input element on the device that generates a sliding input electrical signal having a magnitude responsive to a sliding input from a user;
- an electronic circuit connected to the accelerometer and connected to the input element wherein the circuit:
  - comprises a control unit, a memory unit, a communications unit, and a battery, wherein the control unit further comprises a micro-controller and a machine-readable storage device;
  - calculates pitch information using an inverse trigonometric function in response to said accelerometer pitch signal without input from a sensor that operates based on a gyroscopic effect;
  - calculates roll information using an inverse trigonometric function in response to said accelerometer roll signal without input from a sensor that operates based on a gyroscopic effect;
  - calculates length information in response to the sliding input electrical signal from the input element; and
  - calculates the orientation and the length of the pointer in an inertial reference frame in Cartesian coordinates in response to said length information, said pitch information, and said roll information;
- a communications module electrically coupled to the electronic circuit which generates a digital signal responsive to said pitch information, said roll information, and said length information wherein:
  - the digital signal is transmitted electronically to a receiving element connected to the display; and
  - the digital signal can be used by circuitry coupled to the display to manipulate the pointer on the display.

14. The device of claim 13 wherein:
the communications module further generates a wireless digital serial near field communications protocol; and
the device is a wearable device selected from the group of a glove, a bracelet, a watch, and a shoe.

15. The device of claim 13 wherein:
the electronic circuit further calculates a yaw signal;
the yaw signal is calculated from user input from a device selected from the group of a pair of control buttons, a pair of triggers, a slide switch, a touch pad, and a scroll wheel; and
yaw signal calculation does not comprise input from a device selected from the group of a gyroscope and a magnetic sensor
the device further comprises the display screen; and
the yaw signal is configured to horizontally rotate the field of view on the screen of the display.

16. A method for presenting user manipulation of a portable device onto a display, the method comprising the steps of:
- establishing the portable device;
- establishing a rotational sensor in the portable device that generates tilt signals responsive to a gravitational vector in the device wherein the rotational sensor comprises a MEMS rotational accelerometer;
- measuring pitch and roll about two perpendicular axes orthogonal to the gravitational vector in response to the projection of static gravity on the tilted MEMS rotational accelerometer;
- establishing a sliding user input element on the device that generates a sliding input signal in response to a sliding motion by a user wherein the sliding user input element does not comprise a device selected from the group of an accelerometer and a gyroscope;
- using the sliding input element to generate a sliding input electrical signal of a magnitude controlled by the user;
- establishing an electronic circuit that comprises a control unit, a memory unit, and a communications unit, and an electrical storage device, wherein the control unit further comprises a micro-controller;
- connecting the circuit to the rotational sensor;
- connecting the circuit to the sliding input element;
- using the circuit to calculate pitch and roll from the tilt signals measured by the MEMS rotational accelerometer in the portable device, where pitch and roll further determine a vector orientation;
- determining a vector length in response to the sliding input electrical signal;
- establishing a display that shows objects in a minimum of two dimensions;
- showing a graphical object on the display wherein the size of the graphical object is responsive to the vector length and the orientation of the graphical object is responsive to the vector orientation;
- establishing a battery to power the portable device; and
- establishing a circuit that manages the battery.

17. The method of claim 16 wherein:
establishing a portable electronic device further comprises an electronic device selected from the group of a wearable device and a hand-held device; and
establishing a display further comprises establishing a display screen on the portable electronic device.

18. The method of claim 16 wherein:
determining the vector orientation further comprises determining the vector orientation in a 3-dimensional spherical coordinate system in response to pitch and roll signals by using arcsin functions;
showing the graphical object on the display further comprises showing the graphical object by using Cartesian coordinates;
using Cartesian coordinates further comprises using Euler angles; and
using Euler angles further comprises using the following three Euler equations:

$$X = R(t) \cdot \cos(\alpha) \cdot \sin(\beta)$$

$$Y = R(t) \cdot \sin(\alpha) \cdot \sin(\beta)$$

$$Z = R(t) \cdot \cos(\beta)$$

wherein X, Y, and Z represent a location in a Cartesian coordinate domain presented on the display wherein X, Y and Z also have the same origin as a spherical coordinate domain defined by the vector length R(t) responsive to the sliding input signal, α is an angle representing the longitudinal relationship between R(t) and the ZX plane in the Cartesian coordinates that is responsive to the accelerometer pitch information, and β is an angle representing the colatitudinal relationship between R(t) and the Z axis that is responsive to the accelerometer roll information.

19. The method of claim 16 further comprising the steps of:
establishing a second user input element wherein the second user input element comprises a pair of push button triggers;
connecting the digital electronic circuit to the second user input element;
calculating field of view information in the electronic circuit in response to the second user input element, wherein the field of view information comprises information selected from the group of field of view translation information, field of view rotation information, and field of view size information; and
communicating the field of view information to the display.

20. The method of claim 16 further comprising the steps of:
simulating a vector yaw in response to the accelerometer pitch, the accelerometer roll, and the sliding input element without using any additional sensing element.

* * * * *